United States Patent
Hirata et al.

(10) Patent No.: US 11,135,543 B2
(45) Date of Patent: Oct. 5, 2021

(54) EXHAUST GAS TREATMENT SYSTEM

(71) Applicant: Mitsubishi Heavy Industries Engineering, Ltd., Kanagawa (JP)

(72) Inventors: Takuya Hirata, Tokyo (JP); Hiroshi Tanaka, Tokyo (JP); Takashi Kamijo, Tokyo (JP); Masayuki Inui, Tokyo (JP); Shimpei Kawasaki, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 304 days.

(21) Appl. No.: 16/321,728

(22) PCT Filed: Feb. 1, 2018

(86) PCT No.: PCT/JP2018/003492
§ 371 (c)(1),
(2) Date: Jan. 29, 2019

(87) PCT Pub. No.: WO2018/143374
PCT Pub. Date: Aug. 9, 2018

(65) Prior Publication Data
US 2019/0160421 A1    May 30, 2019

(30) Foreign Application Priority Data

Feb. 1, 2017    (JP) .............................. JP2017-017118

(51) Int. Cl.
*B01D 53/14* (2006.01)
*B01D 35/06* (2006.01)
(Continued)

(52) U.S. Cl.
CPC ......... *B01D 53/1425* (2013.01); *B01D 35/06* (2013.01); *B01D 37/02* (2013.01);
(Continued)

(58) Field of Classification Search
None
See application file for complete search history.

(56) References Cited

U.S. PATENT DOCUMENTS

| | | | | |
|---|---|---|---|---|
| 4,477,419 A | * | 10/1984 | Pearce | B01D 53/1475 423/228 |
| 6,077,332 A | * | 6/2000 | Barnes | B01D 53/1425 210/222 |

(Continued)

FOREIGN PATENT DOCUMENTS

| | | |
|---|---|---|
| CA | 2223132 A1 | 10/1997 |
| EP | 0998968 A2 | 5/2000 |

(Continued)

OTHER PUBLICATIONS

Office Action in corresponding Indian Application No. 201917002946, dated Nov. 14, 2019 (6 pages).

(Continued)

*Primary Examiner* — Jason M Greene
(74) *Attorney, Agent, or Firm* — Osha Bergman Watanabe & Burton LLP

(57) ABSTRACT

A reduction device, an acid gas recovery device, a recovery device collector, and a first removed substance returning line are provided. The reduction device is configured to perform a reduction process to turn iron oxide to reduced iron by adding a reducing agent. The acid gas recovery device is configured to recover $CO_2$ being acid gas with $CO_2$ absorbing liquid being acid gas absorbing liquid from exhaust gas containing at least powder-shaped iron-based solid substances and the acid gas, which are discharged from the reduction device. The recovery device collector is configured to collect the iron-based solid substance contained in the absorbing liquid with a filter. The iron-based solid substances collected by the recovery device collector are removed, and removed substances containing the removed (Continued)

iron-based solid substances are returned to the reduction device side through the first removed substance returning line.

10 Claims, 11 Drawing Sheets

(51) Int. Cl.
    *B01D 53/96*     (2006.01)
    *B01D 37/02*     (2006.01)
    *B01D 53/62*     (2006.01)
    *B01D 47/06*     (2006.01)
    *B03C 1/00*     (2006.01)
    *B01D 53/78*     (2006.01)
    *F27D 17/00*     (2006.01)
    *B01D 53/22*     (2006.01)
    *C01B 32/50*     (2017.01)

(52) U.S. Cl.
    CPC ............ *B01D 47/06* (2013.01); *B01D 53/14* (2013.01); *B01D 53/1475* (2013.01); *B01D 53/228* (2013.01); *B01D 53/62* (2013.01); *B01D 53/78* (2013.01); *B01D 53/96* (2013.01); *B03C 1/00* (2013.01); *F27D 17/00* (2013.01); *B01D 2257/304* (2013.01); *B01D 2257/504* (2013.01); *B01D 2257/60* (2013.01); *B01D 2258/025* (2013.01); *C01B 32/50* (2017.08); *Y02C 20/40* (2020.08); *Y02P 10/25* (2015.11); *Y02P 20/151* (2015.11); *Y02P 70/10* (2015.11)

(56) References Cited

U.S. PATENT DOCUMENTS

| | | | |
|---|---|---|---|
| 9,557,113 | B2 | 1/2017 | Sakaguchi et al. |
| 2009/0193970 | A1* | 8/2009 | Iijima ................ B01D 53/1425 95/186 |
| 2011/0056377 | A1 | 3/2011 | Moniwa et al. |
| 2014/0193319 | A1* | 7/2014 | Balfe ................ B01D 53/1475 423/234 |
| 2014/0252700 | A1* | 9/2014 | Sakaguchi ......... B01D 53/1418 266/155 |
| 2015/0258497 | A1* | 9/2015 | Reddy ................ B01D 53/1425 423/228 |
| 2016/0121260 | A1 | 5/2016 | Hirata et al. |

FOREIGN PATENT DOCUMENTS

| | | |
|---|---|---|
| EP | 0998968 A3 | 5/2000 |
| JP | S47-038519 A | 12/1972 |
| JP | H03-151015 A | 6/1991 |
| JP | H05-9529 A | 1/1993 |
| JP | H10-511142 A | 10/1998 |
| JP | 2004-105923 A | 4/2004 |
| JP | 2011-56399 A | 3/2011 |
| JP | 2013-108108 A | 6/2013 |
| KR | 101678805 B1 | 11/2016 |
| WO | 2018-016775 A1 | 1/2018 |

OTHER PUBLICATIONS

Extended European Search Report in corresponding European Application No. 18 748 476.1, dated May 29, 2019 (7 pages).

\* cited by examiner

<IN SOLID-LIQUID SEPARATION OPERATION>
ALONG WITH $CO_2$ ABSORPTION OPERATION

EXHAUST GAS TREATMENT SYSTEM

TECHNICAL FIELD

The present invention relates to an exhaust gas treatment system.

BACKGROUND ART

For example, the following technology for removing and recovering $CO_2$ is proposed. That is, when $CO_2$ in exhaust gas generated through an iron manufacturing process and the like is recovered by a $CO_2$ recovery device, for example, the exhaust gas is drawn in an absorbing tower, and is brought into contact with $CO_2$ absorbing liquid (hereinafter, referred to as "absorbing liquid") in the absorbing tower. In this manner, the absorbing liquid absorbs $CO_2$ in the exhaust gas. The absorbing liquid having absorbed $CO_2$ is sent to a regenerating tower, and is heated with steam. With this, $CO_2$ is released, and $CO_2$ having high purity is recovered.

With the existing $CO_2$ recovery device, a consumption amount of the steam for regenerating the absorbing liquid is enormous. Thus, in order to reduce the consumption amount of the steam, energy-saving measures further need to be taken. In addition, in a case where solid substances such as dust contained in the exhaust gas is accumulated in the absorbing liquid, when the solid substances are separated and removed from the absorbing liquid by, for example, a reclaimer, the following problems arise. That is, a loss of an absorbing agent adhering to the discharged solid substances need to be reduced, and the solid substances need to be removed efficiently from the absorbing liquid.

In view of this, as a technology for efficiently removing the solid substances from the absorbing liquid, for example, the following technology is proposed. That is, flocculant is added to the absorbing liquid so as to turn fine metallic impurities in the absorbing liquid into coarse flocs. In this manner, efficiency of solid substance separation in a filtration device is improved (Patent Document 1).

Further, there is proposed a technology using a filtration device, which includes mesh holding a filtering medium having a higher specific gravity than that of the solid substances captured by the absorbing liquid. With this technology, after the filtration device is backwashed, discharged substances in which the solid substances and the filtering medium are mixed are subjected to sedimentation and filtration. In this manner, the filtering medium is recovered and reused (Patent Document 2).

CITATION LIST

Patent Documents

Patent Document 1: JP 03-151015 A
Patent Document 2: JP 2011-56399 A

SUMMARY OF INVENTION

Problem to be Solved by the Invention

However, in the technology of Patent Document 1, the discharged solid substances and the absorbing agent are merely sedimented and separated. Thus, a loss amount of the absorbing agent is not reduced sufficiently.

Further, in the technology of Patent Document 2, the removed solid substances are turned into wastes, and additionally need to be processed as wastes. Thus, cost for the process is increased.

That is, with the existing technology, a method of separating and removing the solid substances from the absorbing liquid has been improved for the purpose of reducing the loss amount of the absorbing agent adhering to the discharged solid substances and efficiently removing the solid substances in the absorbing liquid. However, there still arises a problem in that the cost for processing the removed solid substances as waste is high.

Therefore, it is desired that the following technology is achieved. That is, iron-based solid substances are collected from exhaust gas containing the iron-based solid substances and acid gas (for example, $CO_2$ and $H_2S$), which are discharged from a reduction device, for example, in the iron manufacturing process, and after that, the collected solid substances are efficiently utilized. With this technology, a waste amount is reduced.

In view of the above-mentioned problems, the present invention has an object to provide an exhaust gas treatment system, which is capable of efficiently utilizing collected substances obtained by collecting iron-based solid substances from exhaust gas containing the iron-based solid substances and acid gas discharged from a reduction device.

Solution to Problem

In order to achieve the above-mentioned object, according to a first aspect of the present invention, an exhaust gas treatment system for exhaust gas from a reduction device includes a reduction device, an acid gas recovery device, a recovery device collector, and a removed substance returning line. The reduction device is configured to perform a reduction process to turn iron oxide to reduced iron. The acid gas recovery device is configured to recover acid gas with acid gas absorbing liquid from exhaust gas containing at least iron-based solid substances and the acid gas, which are discharged from the reduction device. The recovery device collector is configured to collect the iron-based solid substances contained in the acid gas absorbing liquid. Through the removed substance returning line, the iron-based solid substances collected by the recovery device collector are removed, and recovery device removed substance, which contain the iron-based solid substances that are removed, are returned to the reduction device side.

According to a second aspect of the present invention, in the first aspect of the present invention, the recovery device collector includes an extraction line for extracting the acid gas absorbing liquid from the acid gas recovery device and a liquid filtrate supply line for returning liquid filtrate obtained after collecting the iron-based solid substances to the acid gas recovery device.

According to a third aspect of the present invention, in the first aspect or the second aspect of the present invention, the exhaust gas treatment system for exhaust gas from a reduction device further includes a cooling tower, a collector, a cooling tower removing device, and a removed substance returning line. The cooling tower is provided on upstream of the acid gas recovery device, and is configured to cool the exhaust gas containing at least the iron-based solid substances and the acid gas, which are discharged from the reduction device, with circulating cooling water. The collector is configured to collect the iron-based solid substances contained in the circulating cooling water. The cooling tower removing device is configured to remove the iron-based solid substances collected by the collector. Through the removed substance returning line, cooling tower removed substances, which contain the iron-based solid substances removed by the cooling tower removing device, are returned to the reduction device side.

According to a fourth aspect of the present invention, in the third aspect of the present invention, the cooling tower removing device includes an extraction line for extracting cooling water from the cooling tower and a liquid filtrate supply line for returning liquid filtrate obtained after collecting the iron-based solid substances to the cooling tower.

According to a fifth aspect of the present invention, in the first aspect to the fourth aspect of the present invention, the collector includes a filter. The filter is any one of a cartridge filter, a precoat filter, a metallic slit filter, a wire net filter, a sintered metal filter, and a magnetic filter, or combination thereof.

According to a sixth aspect of the present invention, in the first aspect to the fourth aspect of the present invention, the collector includes a filter. The filter is any one of a cartridge filter, a precoat filter, a metallic slit filter, a wire net filter, and a sintered metal filter, or combination thereof. The filter has a surface on which a filtering medium is provided, and iron-based compound particles coated with a resin are accumulated on the filtering medium.

According to a seventh aspect of the present invention, in the first aspect to the fourth aspect of the present invention, the collector includes a filter, and the filter is a magnetic filter. The magnetic filter has a surface on which a filtering medium is provided. The filtering medium is formed of magnetic iron-based compound particles coated with a resin, and when a magnetic field is applied, the magnetic iron-based compound particles are accumulated on the surface of the magnetic filter.

Advantageous Effect of Invention

According to the present invention, the iron-based solid substances being substances collected by the useful filter are recycled in the reduction device. With this, a waste amount disposed in the related art can be largely reduced. Further, the reduced iron can be obtained by subjecting the iron-based solid substances to the reduction process in the reduction device again. Thus, recycling efficiency can be improved.

BRIEF DESCRIPTION OF DRAWINGS

FIG. 6-1 is a schematic view of an operation process of a recovery device collector in the second embodiment.

FIG. 6-2 is a schematic view of an operation process of the recovery device collector in the second embodiment.

FIG. 6-3 is a schematic view of an operation process of the recovery device collector in the second embodiment.

FIG. 6-4 is a schematic view of an operation process of the recovery device collector in the second embodiment.

FIG. 6-5 is a schematic view of an operation process of the recovery device collector in the second embodiment.

FIG. 6-6 is a schematic view of an operation process of a filtration film device in the second embodiment.

DESCRIPTION OF EMBODIMENTS

Now, with reference to the accompanying drawings, embodiments of the present invention are described in detail. Note that, the present invention is not limited to those embodiments, and when a plurality of embodiments are given, the present invention is intended to include a configuration obtained by combining those embodiments.

First Embodiment

Figure 1:
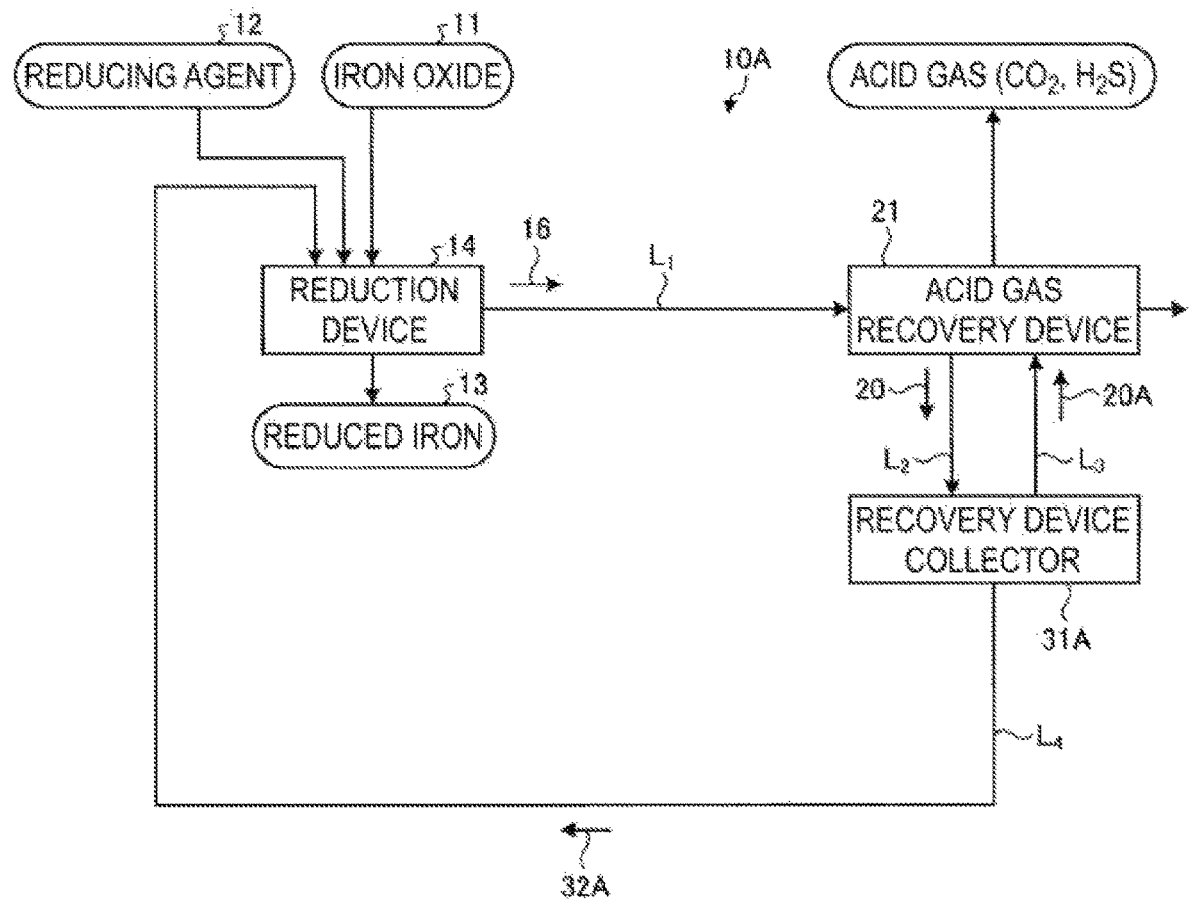
FIG. 1 is a schematic view of an exhaust gas treatment system for exhaust gas generated from a reduction device according to a first embodiment of the present invention.

FIG. 1 is a schematic view of an exhaust gas treatment system for exhaust gas generated from a reduction device according to a first embodiment of the present invention. As illustrated in FIG. 1, an exhaust gas treatment system 10A according to this embodiment includes a reduction device 14, an acid gas recovery device 21, a recovery device collector 31A, and a first removed-substance returning line $L_4$. The reduction device 14 is configured to perform a reduction process to turn iron oxide (for example, iron ore) 11 to reduced iron 13 by adding a reducing agent 12. The acid gas recovery device 21 is configured to recover $CO_2$ being acid gas from exhaust gas 16 with $CO_2$ absorbing liquid (hereinafter, referred to as "absorbing liquid") 20 being acid gas absorbing liquid. The exhaust gas 16 is discharged from the reduction device 14 through an exhaust gas line $L_1$, and contains at least powder-shaped iron-based solid substances 15 and acid gas ($CO_2$). The recovery device collector 31A is configured to collect the iron-based solid substances 15 contained in the absorbing liquid 20 with a filter. The iron-based solid substances 15 collected by the recovery device collector 31A are removed, and removed substances 32A containing the removed iron-based solid substances 15 is returned to the reduction device 14 side through the first removed-substance returning line $L_4$. Note that, in this embodiment, as acid gas, $CO_2$ is used. However, the present invention is not limited thereto, and may be applied to acid gas such as $H_2S$.

In this embodiment, the recovery device collector 31A includes an extraction line $L_2$ and a liquid filtrate supply line $L_3$. Through the extraction line $L_2$, the absorbing liquid 20 is extracted from the acid gas recovery device 21. Through the liquid filtrate supply line $L_3$, liquid filtrate 20A after collecting the iron-based solid substances 15 is returned to the acid gas recovery device 21 through the liquid filtrate supply line $L_3$. The liquid filtrate 20A is reused as absorbing liquid in the acid gas recovery device 21.

The iron-based solid substances 15 present in the absorbing liquid 20 extracted from the acid gas recovery device 21 through the extraction line $L_2$ are separated at the recovery device collector 31A including a collecting member such as a filter. Then, the iron-based solid substances held in the filter and adhering absorbing agent components are separated from each other by washing the filter with discharged water containing low concentration of the $CO_2$ absorbing agent or cleaning water in the system. The separated absorbing agent components are recovered together with the discharged water containing low concentration of the $CO_2$ absorbing agent or the cleaning water in the system of the acid gas recovery device 21 through the liquid filtrate supply line $L_3$.

Here, the filter installed in the recovery device collector 31A is not particularly limited as long as the filter collects the iron-based solid substances 15 contained in the absorbing liquid 20. It is preferred that the filter be, for example, any one of a cartridge filter, a precoat filter, a metallic slit filter, a wire net filter, a sintered metal filter, and a magnetic filter, or combination thereof.

Here, the filter for collecting the iron-based solid substances 15 is installed in the recovery device collector 31A. Further, as removing means of removing the iron-based solid substances 15 from the filter, for example, a scraper, a backwashing device, and the like can be exemplified. Further, before desorption, it is preferred that the filter be dried to some extent.

Meanwhile, the removed substances 32A containing the iron-based solid substances 15 as main components, which are collected by the filter, are recycled in the reduction device 14 for iron ore through the first removed-substance returning line $L_4$.

In this embodiment, the iron-based solid substances 15 being substances collected by the useful filter are recycled in the reduction device 14. With this, a waste amount disposed in the related art can be largely reduced. Further, the reduced iron 13 can be obtained by subjecting the iron-based solid substances to a reduction process in the reduction device 14 again. Thus, recycling efficiency can be improved.

Figure 2:
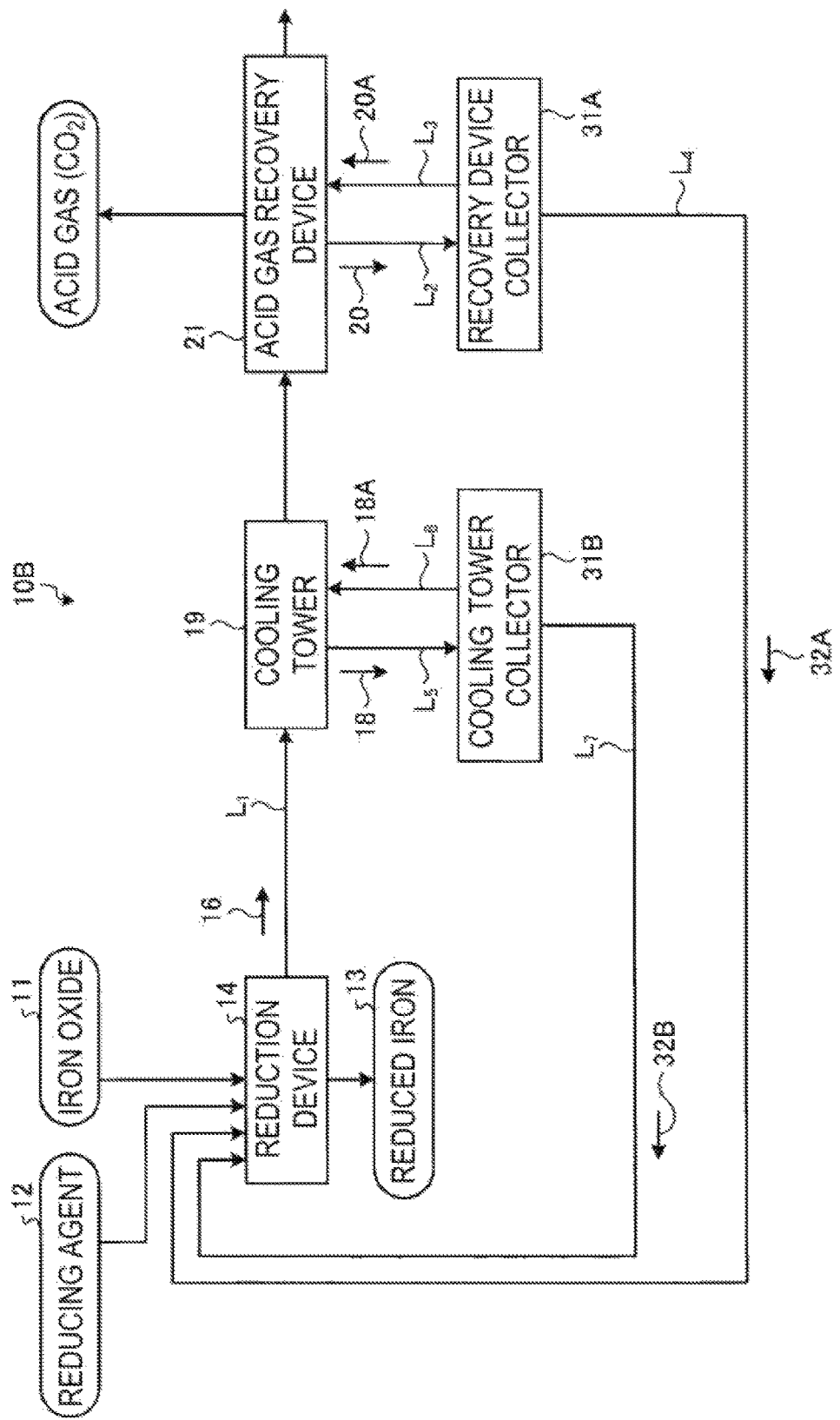
FIG. 2 is a schematic view of another exhaust gas treatment system for exhaust gas generated from the reduction device according to the first embodiment.

FIG. 2 is a schematic view of another exhaust gas treatment system for exhaust gas generated from the reduction device according to this embodiment. In FIG. 2, the same components as those in the exhaust gas treatment system 10A according to the first embodiment of the present invention illustrated in FIG. 1 are indicated with the same reference symbols, and redundant description is omitted. As illustrated in FIG. 2, in an exhaust gas treatment system 10B according to this embodiment, a cooling tower 19 for cooling the exhaust gas is installed on upstream of the acid gas recovery device 21. Cooling water 18 circulating through the cooling tower 19 is similarly subjected to filtration by the filter in a cooling tower collector 31B. Cooling tower removed substances 32B containing the iron-based solid substances 15 are recycled in the reduction device 14 for iron ore through a second removed-substance returning line $L_7$. Note that, the cooling tower collector 31B includes an extraction line $L_5$ and a liquid filtrate supply line $L_6$. Through the extraction line $L_5$, the cooling water 18 is extracted from the cooling tower 19. Through the liquid filtrate supply line $L_6$, liquid filtrate 18A after collecting the iron-based solid substances 15 is returned to the cooling tower 19.

In this embodiment, the iron-based solid substances 15 being substances collected by the useful filter, which are contained in the cooling water 18 circulating through the cooling tower 19, are recycled in the reduction device 14. With this, a waste amount disposed in the related art can be largely reduced. Further, the reduced iron 13 can be obtained by subjecting the iron-based solid substances to a reduction process in the reduction device 14 again. Thus, recycling efficiency can be improved.

Figure 3:
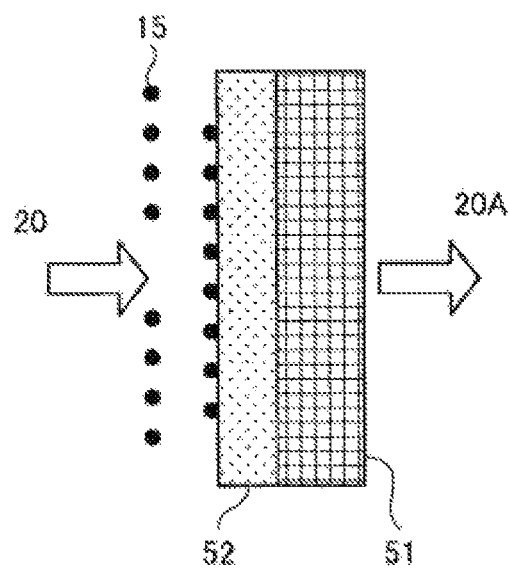
FIG. 3 is an explanatory view of a filtration mechanism installed in a collector in the first embodiment.

FIG. 3 is an explanatory view of a filtration mechanism installed in the collector in the first embodiment.

As illustrated in FIG. 3, in this embodiment, a filter 51 has iron-based compound particles as a filtering medium 52 accumulated thereon. As iron-based compound particles, iron oxide (for example, $Fe_2O_3$, $Fe_3O_4$, $Fe_2O_3 \cdot H_2O$, $FeO(OH)$, $FeO$) and iron carbonate ($FeCO_3$) may be exemplified.

The iron-based compound particles as the filtering medium 52 accumulated on the filter 51 are coated with, for example, an epoxy resin. A diameter of each of the iron-based compound particles is larger than a mesh size of the filter 51. The particles are supplied and accumulated on a filter surface of the filter 51. In this manner, the filtering medium 52 being a filtering layer is formed.

Efficiency of removing the solid substances by the filter 51 can be enhanced by forming the filtering medium 52 formed of the iron-based compound particles. Further, the iron-based compounds are used as the filtering medium particles. Accordingly, even in a case where the filtering medium is recycled in the reduction device 14 for iron ore, the filtering medium is not turned to impurities in the reduction process. Thus, an amount of impurities mixed into the reduction device 14 can be reduced.

Further, in this embodiment, it is preferred that the iron-based compound particles be coated with a coating material such as an epoxy resin. By coating surfaces of the particles with an epoxy resin or the like, iron ions are prevented from being dissolved from the filtering medium 52 to the absorbing liquid 20 at a filter portion of the recovery device collector 31A. When the iron ions are present in the absorbing liquid, oxidative degradation of an absorbing agent mixed in the absorbing liquid is promoted. Accordingly, an acid gas absorbing performance is degraded. In order to avoid this, the above-mentioned coating is provided.

Here, as a coating agent, a material such as an epoxy resin that is thermally decomposed at a high temperature is used. Accordingly, without separating the iron-based solid substances 15 present in the absorbing liquid 20 and the filtering medium particles from each other, the filtering medium can be recycled directly as a raw material in the reduction device 14 for iron ore.

As a temperature of a coating material of an epoxy resin, it is preferred that the temperature be equal to or higher than a process temperature in the acid gas recovery device 21 and be equal to or lower than a reduction process temperature in the reduction device 14 for iron ore, that is, for example, within a range of from 200° C. to 300° C.

Figure 4:
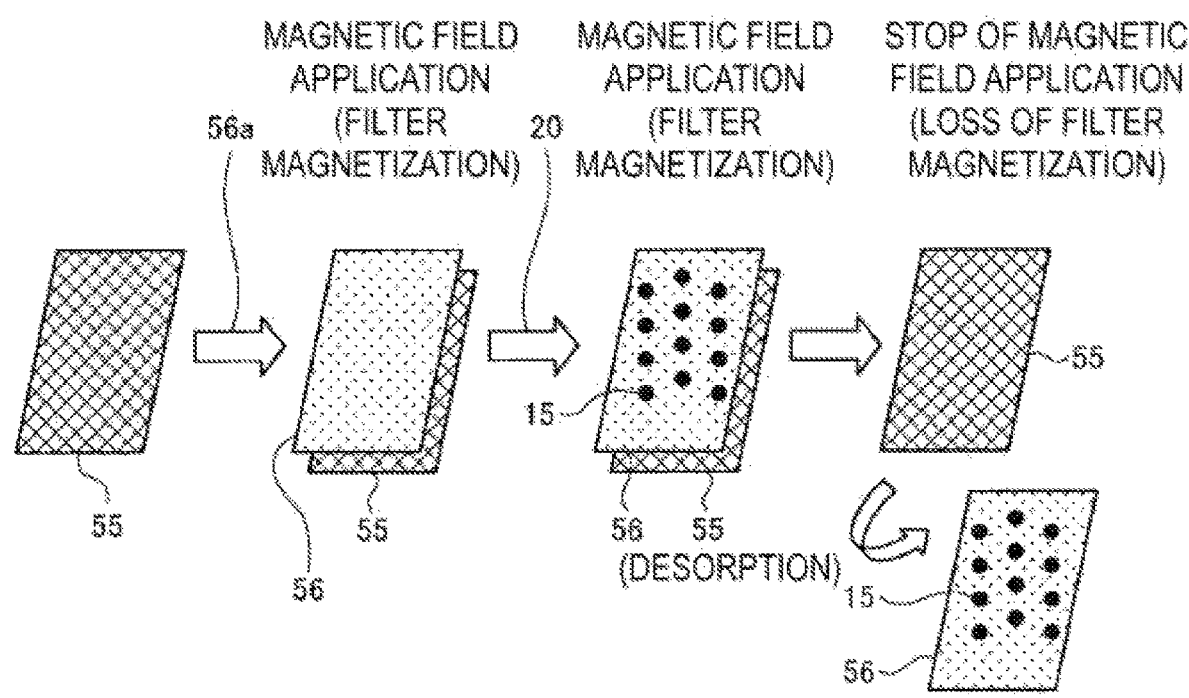
FIG. 4 is an explanatory view of another filtration mechanism installed in the collector in the first embodiment.

FIG. 4 is an explanatory view of another filtration mechanism installed in the collector in this embodiment. As illustrated in FIG. 4, in this embodiment, a magnetic filter is used as a filter 55, and applies a magnetic field. Accordingly, iron-based compound particles 56a are accumulated, and a magnetic filtering medium 56 is accumulated. The magnetic iron-based compound particles 56a are coated with a resin such as an epoxy resin similarly to the above description, and the iron ions are prevented to be dissolved.

As illustrated in FIG. 4, the magnetic particles 56a are supplied on a surface of the magnetic filter 55 to which a magnetic field is applied, and the magnetic filtering medium 56 is accumulated. When the particles are supplied, even in a case where the iron-based compound particles 56a smaller than a mesh size of the magnetic filter 55 are used, the magnetic filtering medium 56 is formed because the magnetic field is generated. Therefore, as compared to the case in FIG. 3, a fine filter layer is obtained, and efficiency of collection can be improved.

Further, in a case where the absorbing liquid 20 is subjected to a filtration process, the magnetic filter 55 and the magnetic filtering medium 56 are magnetized under a state in which the magnet field is applied. Sequentially, the absorbing liquid 20 containing the iron-based solid substances 15 is subjected to the filtration process. In a case where the iron-based solid substances 15 are magnetic when the absorbing liquid 20 passes through the magnetic filtering medium 56, the iron-based solid substances 15 are collected by the filtering medium 56 with a magnetic force. Further, even when the iron-based solid substances 15 are not magnetic, the iron-based solid substances 15 hit the magnetic filtering medium 56 formed finely, and are collected. After completion of the filtration process, the application of the magnetic field is stopped, and magnetization of the filter is lost. Then, the filtering medium 56 having collected the iron-based solid substances 15 are removed from the magnetic filter 55.

In this embodiment, an operation for applying the magnetic field to the filter is performed. With this, the filtering medium for collecting the iron-based solid substances 15 can be formed finely, and an amount of the collected iron-based solid substances 15 can be increased. Further, with the operation for applying the magnetic field, the magnetic filter 55 and the filtering medium 56 can easily adhere to and be removed from each other.

Second Embodiment

Figure 5:
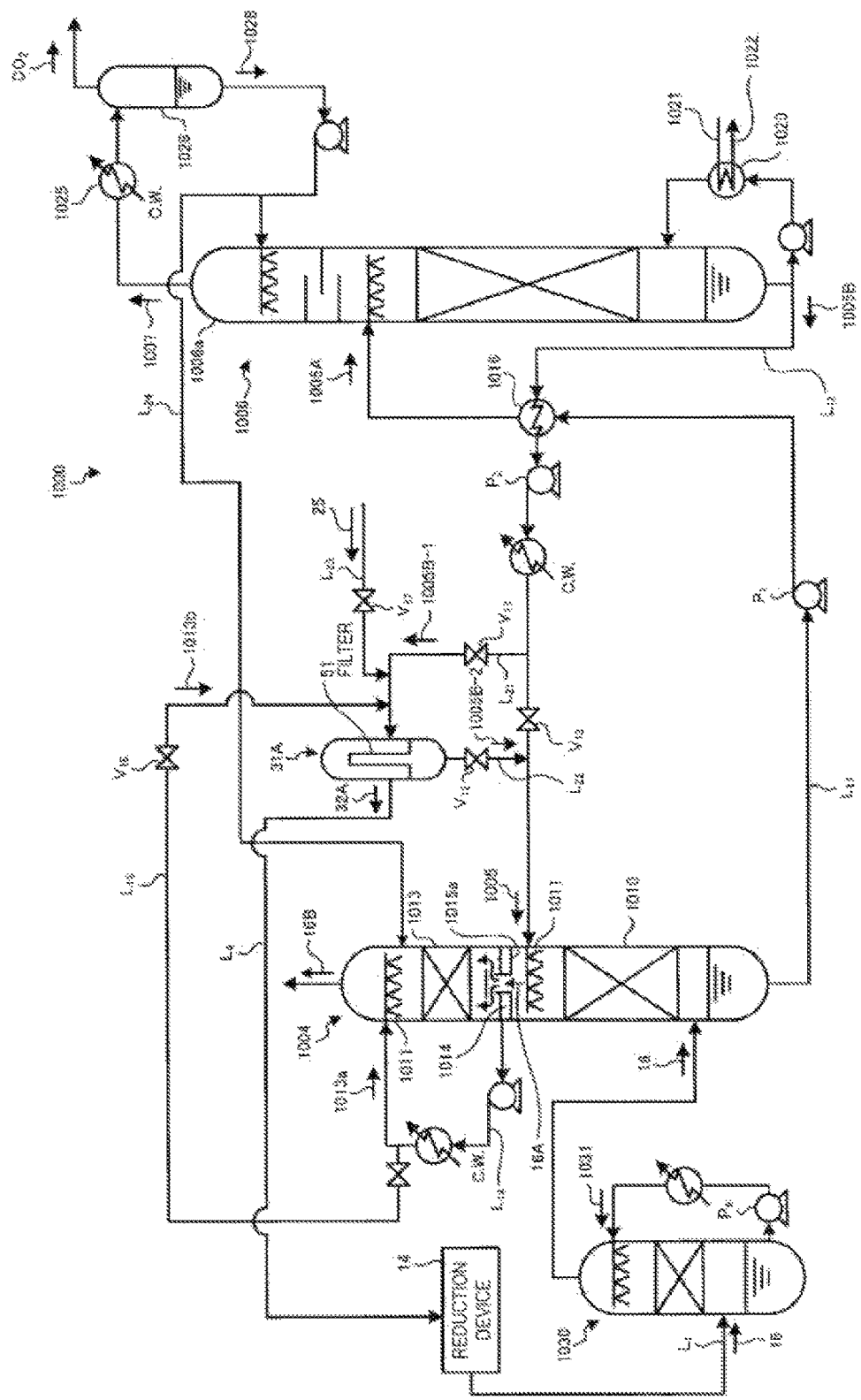
FIG. 5 is a schematic view of a $CO_2$ recovery device in a second embodiment of the present invention.

In this embodiment, carbon dioxide ($CO_2$) is exemplified as acid gas, and now description is made of a case of a carbon dioxide recovery device (hereinafter, referred to as "$CO_2$ recovery device") as an acid gas recovery device. FIG. 5 is a schematic view of a $CO_2$ recovery device in a second embodiment of the present invention. As illustrated in FIG. 5, a $CO_2$ recovery device 1000 in the second embodiment includes the reduction device 14, a $CO_2$ absorbing tower (hereinafter, referred to as "absorbing tower") 1004, an absorbing liquid regenerating tower (hereinafter, referred to as "regenerating tower") 1006, a rich solution supply line $L_{11}$, a lean solution supply line $L_{12}$, the recovery device collector 31A, a liquid filtrate supply line $L_{22}$, a desorption device, and a removed substance returning line $L_4$. The reduction device 14 is configured to perform the reduction process to turn the iron oxide (for example, iron ore) 11 to reduced iron. The absorbing tower 1004 is configured to remove $CO_2$ by bringing the iron-based solid substances 15, the exhaust gas 16 containing $CO_2$, which are discharged absorbing tower from the reduction device 14, and $CO_2$ absorbing liquid 1005 into contact with each other. The regenerating tower 1006 is configured to regenerate the $CO_2$ absorbing liquid 1005 by diffusing $CO_2$ from rich solution 1005A having absorbed $CO_2$, through heat exchange with steam from a reboiler 1020. Through the rich solution supply line $L_{11}$, the rich solution 1005A is extracted from the absorbing tower 1004 and introduced to the regenerating tower 1006 side. Through the lean solution supply line $L_{12}$, lean solution 1005B, which is regenerated in the regenerating tower 1006 and is obtained by diffusing $CO_2$ therefrom from the rich solution 1005A, is extracted from the regenerating tower 1006, and the lean solution 1005B is introduced to the absorbing tower 1004 to be reused in the absorbing tower 1004. The recovery device collector 31A is provided to a branch liquid line $L_{21}$ branched from the lean solution supply line $L_{12}$, and is configured to collect the iron-based solid substances 15 contained in branched lean solution 1005B-1 with the filter 51. Through the liquid filtrate supply line $L_{22}$, liquid filtrate 1005B-2 passing through the recovery device collector 31A is returned to the lean solution supply line Lu. The desorption device is configured to remove the iron-based solid substances 15 collected by the recovery device collector 31A. Through the removed substance returning line $L_4$, the removed substances 32A, which is removed in the desorption device and contains the iron-based solid substances 15, are returned to the reduction device 14 side.

In this embodiment, a cooling tower 1030 configured to cool the exhaust gas 16 is installed on upstream of the absorbing tower 1004, and cools the exhaust gas 16 to have a predetermined temperature with circulating cooling water 1031 before the exhaust gas 16 is introduced to the absorbing tower 1004.

Further, the regenerating tower 1006 includes a separation drum 1026, which is configured to condense water steam to condensed water 1028 and to separate the condensed water 1028. The water steam is in released gas 1007 containing $CO_2$ gas together with water steam released from a column top part 1006a of the absorbing liquid regenerating tower 1006. Further, the absorbing tower 1004 includes a $CO_2$ recovery portion 1010, a washing portion 1013, and a condensed water receiving portion 1015a. The $CO_2$ recovery portion 1010 is configured to absorb $CO_2$ in the exhaust gas 16 by bringing the exhaust gas containing $CO_2$ and the $CO_2$ absorbing liquid 1005 into contact with each other. The washing portion 1013 is arranged on an upper side of the $CO_2$ recovery portion 1010, and is configured to cool $CO_2$-free exhaust gas 16A from which $CO_2$ is removed and to recover the contained $CO_2$ absorbing liquid with cleaning water 1013a. The condensed water receiving portion 1015a is arranged below the washing portion 1013, and is configured to recover condensed water 1014 generated in the washing portion 1013. As the cleaning water 1013a used in the washing portion 1013, part of the condensed water 1028 separated in the separation drum 1026 is supplied through a condensed water supply line $L_{24}$. Note that, cleaned exhaust gas 16B from which the $CO_2$ absorbing liquid is removed with the cleaning water 1013a is discharged to the outside from a column top part of the absorbing tower 1004.

Further, in this embodiment, as cleaning water 1013b for cleaning the filter 51, part of the condensed water 1014 containing the $CO_2$ absorbing liquid 1005, which is recovered at the condensed water receiving portion 1015a, is used, and is sent to the recovery device collector 31A through a cleaning water supply line $L_{15}$.

In the recovery method using the $CO_2$ recovery device 1000, in the absorbing tower 1004, the $CO_2$-contained exhaust gas 16 is brought into counterflow contact with the $CO_2$ absorbing liquid 1005 supplied from a nozzle 1011 being a liquid diffuser at the $CO_2$ recovery portion 1010 provided on a lower side of the absorbing tower 1004. $CO_2$ in the $CO_2$-contained exhaust gas 16 is absorbed by the $CO_2$ absorbing liquid 1005 with, for example, a chemical reaction ($2R-NH_2+CO_2 \rightarrow R-NH_3^+ + R-NH-COO^-$, $R-NH_2+H_2O+CO_2 \rightarrow R-NH_3^+ + HCO_3^-$).

Further, the free exhaust gas 16A obtained after $CO_2$ is removed is brought into gas-liquid contact with the cleaning water 1013a containing the $CO_2$ absorbing liquid 1005, which is supplied from the nozzle 1011 at the washing portion 1013. In this manner, the $CO_2$ absorbing liquid 1005 contained in the $CO_2$-free exhaust gas 16A is recovered. Further, the condensed water 1014 containing the $CO_2$ absorbing liquid 1005, which is recovered at the condensed water receiving portion 1015a, is sent through a liquid circulating line $L_{14}$, and is reused as cleaning water of the washing portion 1013.

Further, the rich solution 1005A having high $CO_2$ concentration, which is obtained by absorbing $CO_2$ extracted from a bottom part of the absorbing tower 1004, is supplied to the regenerating tower 1006 by a rich solvent pump $P_1$ through the rich solution supply line $L_{11}$, and is introduced from the vicinity of the column top part 1006a of the regenerating tower 1006 to the column. When the rich solution 1005A flows down the column, an endothermic reaction is caused by water steam indirectly heated by saturated water steam 1021 at the reboiler 1020, and most part of $CO_2$ is released. In this manner, the rich solution 1005A is regenerated. Note that, the saturated water steam 1021 is discharged as condensed water 1022 from the reboiler 1020.

Further, the released gas 1007 containing the water steam released from the rich solution 1005A in the column is guided out from the column top part 1006a of the absorbing liquid regenerating tower 1006. Further, as for the released gas 1007 containing the water steam, the water steam is condensed at a cooling portion 1025, and the water is separated as the condensed water 1028 in the separation drum 1026. Then, only the $CO_2$ gas is released to the outside of the system, and recovery is performed. The condensed water 1028 separated in the separation drum 1026 is supplied to an upper part of the absorbing liquid regenerating tower 1006, an upper part of the absorbing tower 1004, and the like, and adjusts water balance in the closed system.

The lean solution 1005B having low $CO_2$ concentration, which is regenerated in the regenerating tower 1006, is cooled through heat exchange with the rich solution 1005A at a heat exchanger 1016, is sequentially increased in pressure by a lean solvent pump $P_2$, and is further cooled by a lean solvent cooler. After that, the lean solution 1005B is supplied to the absorbing tower 1004 again, and is circulated and reused as the $CO_2$ absorbing liquid 1005.

In this embodiment, at the time of performing such $CO_2$ recovery, in a case where concentration of the iron-based solid substances 15 in the lean solution 1005B is increased, the lean solution 1005B is introduced to the recovery device collector 31A, and the iron-based solid substances 15 remaining in the lean solution 1005B-1 are collected with the filter 51. Accordingly, the lean solution 1005B-2 from which the iron-based solid substances 15 are removed can be supplied to the lean solution supply line $L_{12}$.

With this, the solid substance concentration in the $CO_2$ absorbing liquid 1005 circulating through the absorbing tower 1004 and the regenerating tower 1006 is reduced.

Further, in the recovery device collector 31A, after the recovery device removed substances 32A are removed in the desorption device (not shown), the recovery device removed substances 32A are recycled in the reduction device 14 for iron ore through the removed substance returning line $L_4$.

Figures 1, 6:
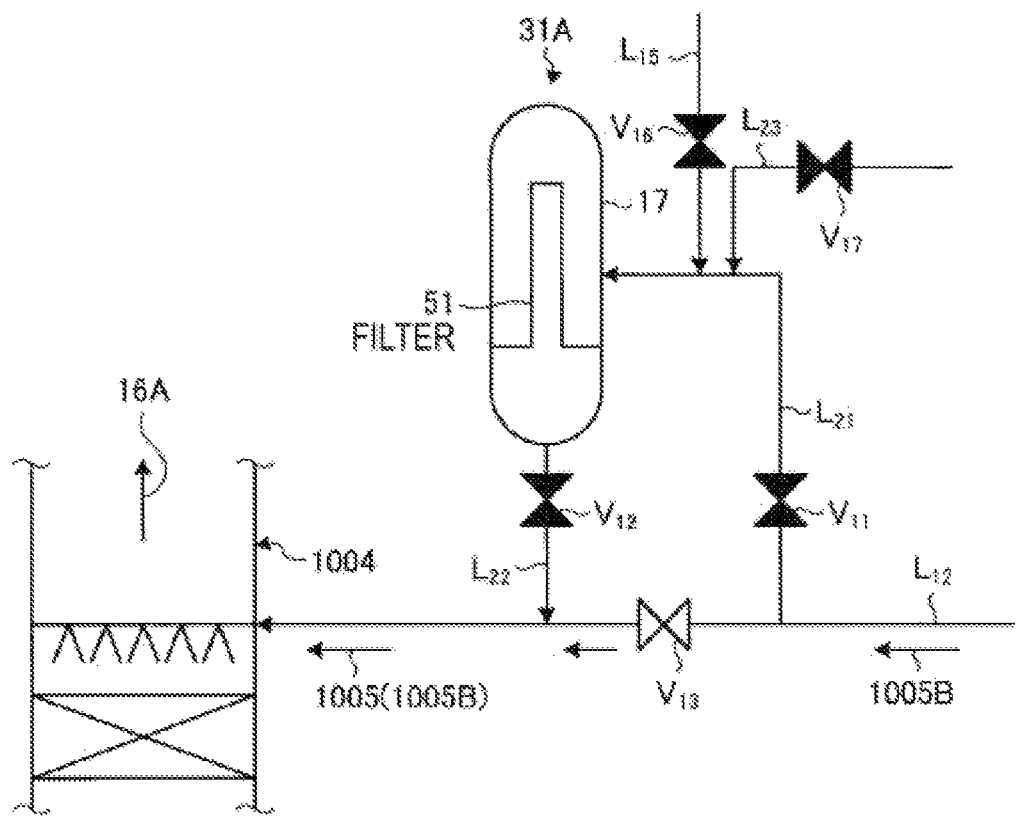
Figures 2, 6:
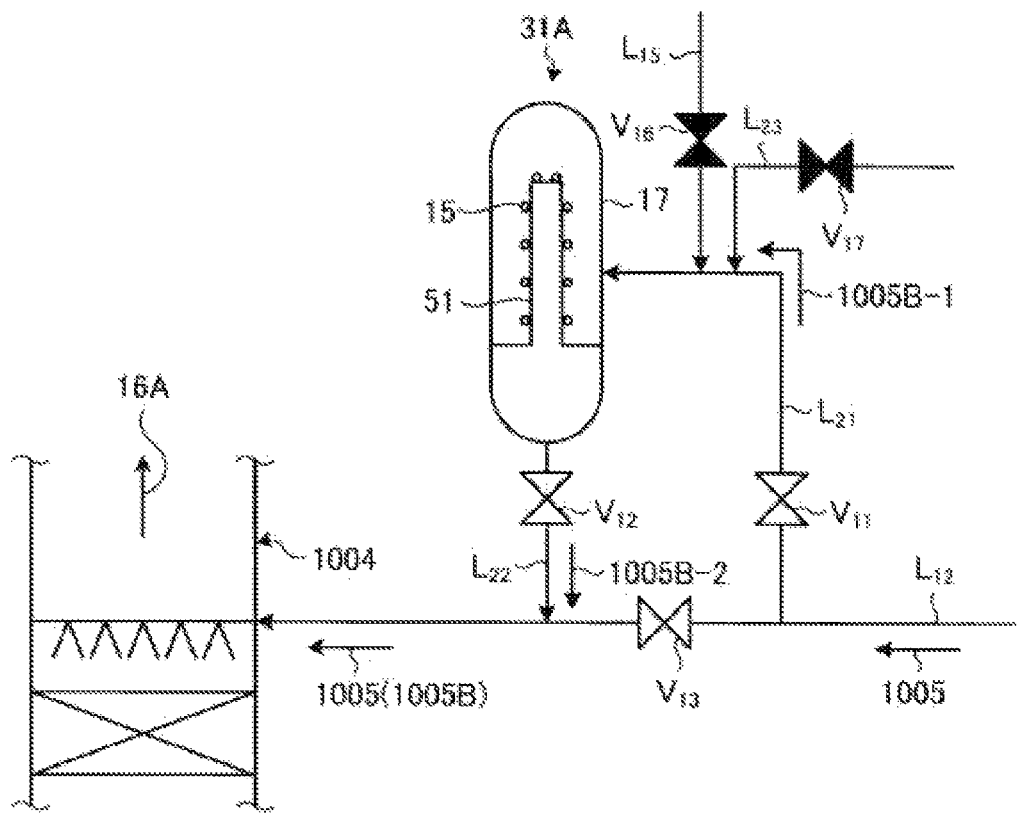
Figures 3, 6:
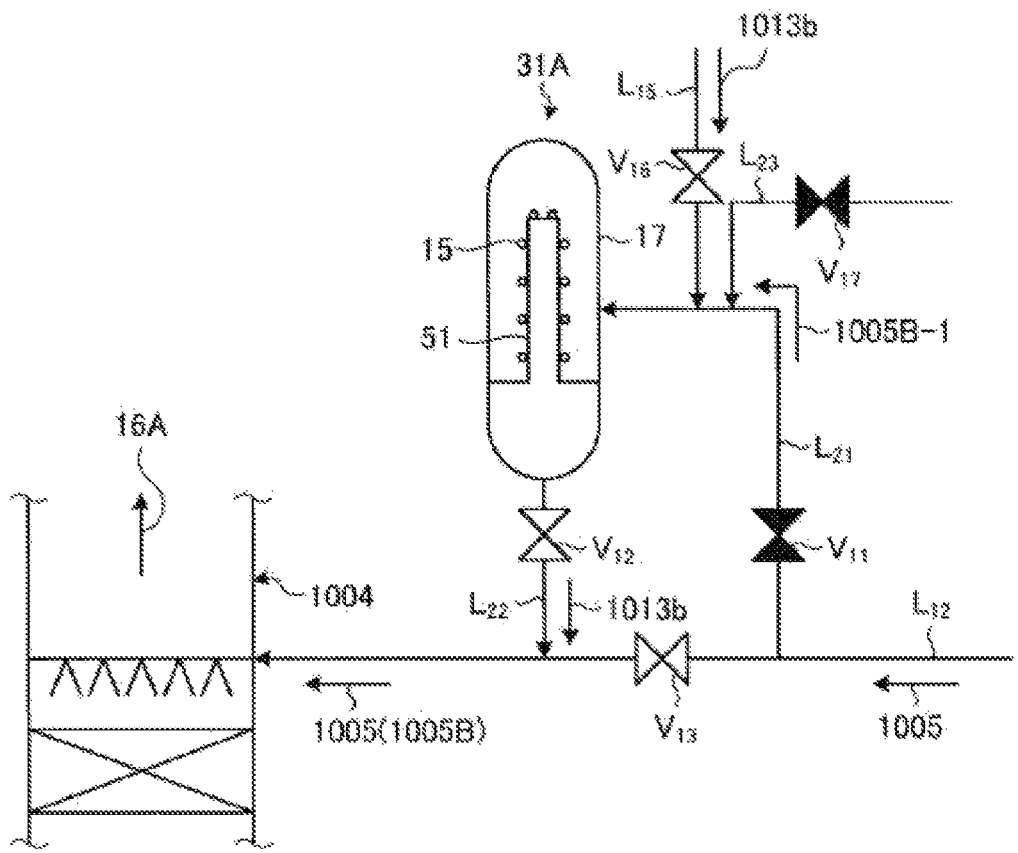
Figures 4, 6:
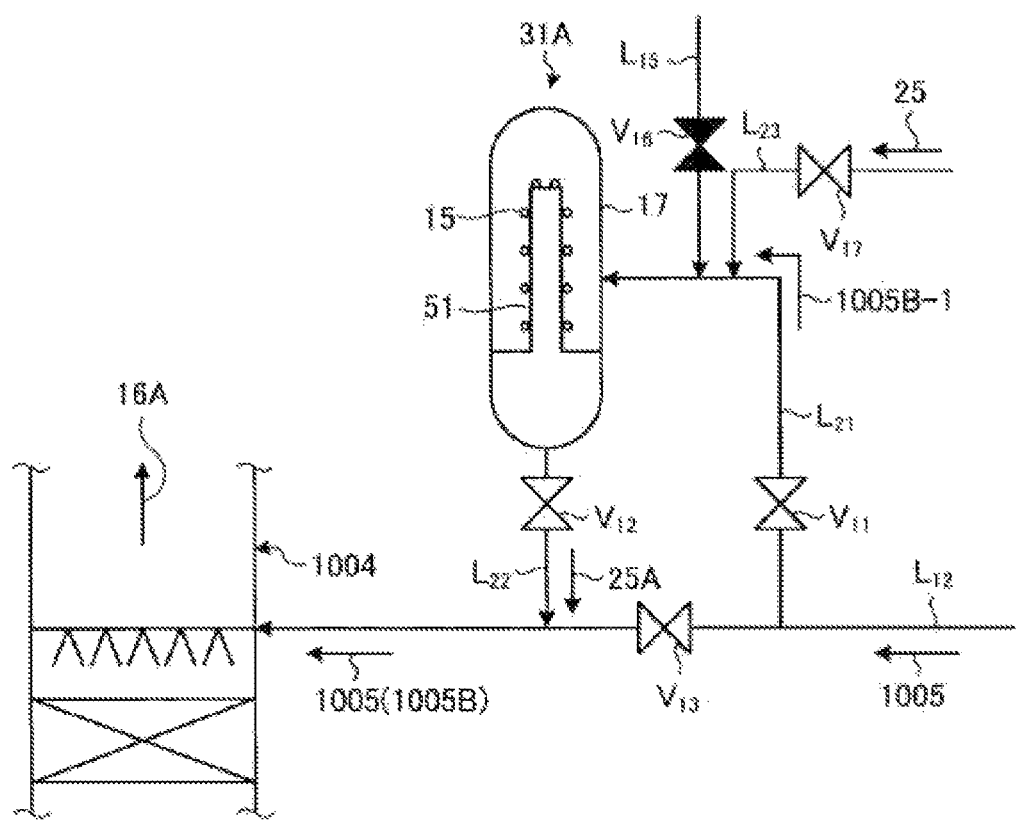
Figures 5, 6:
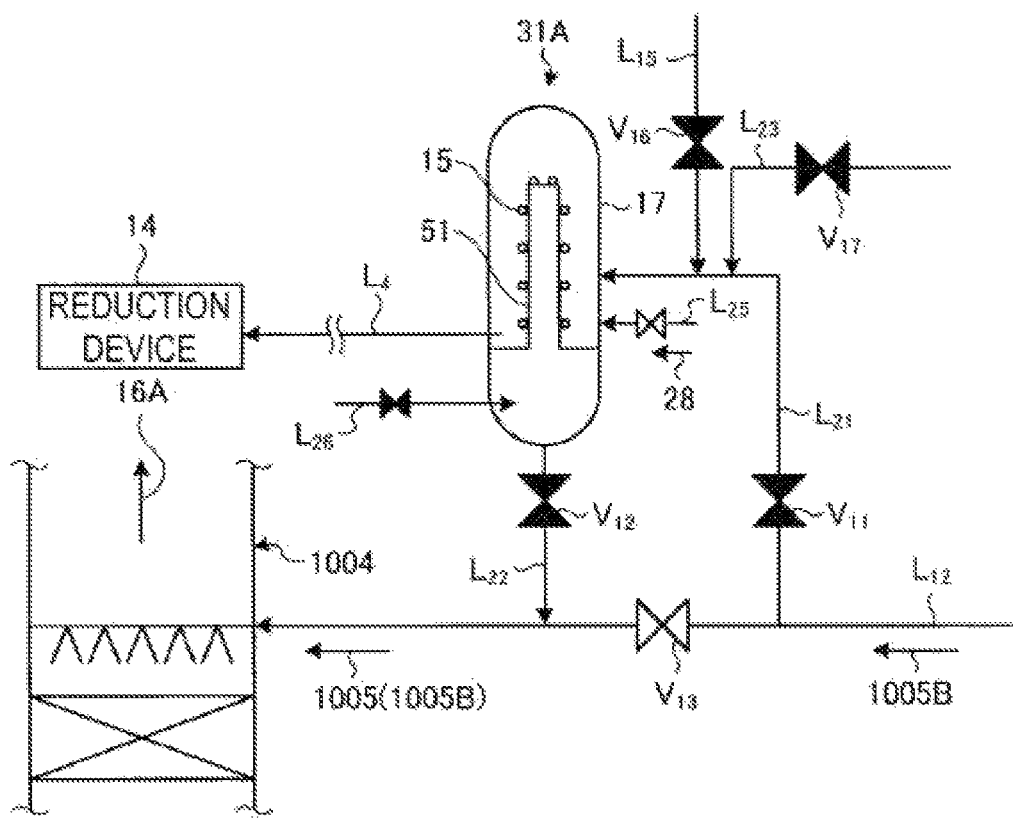
Figure 6:
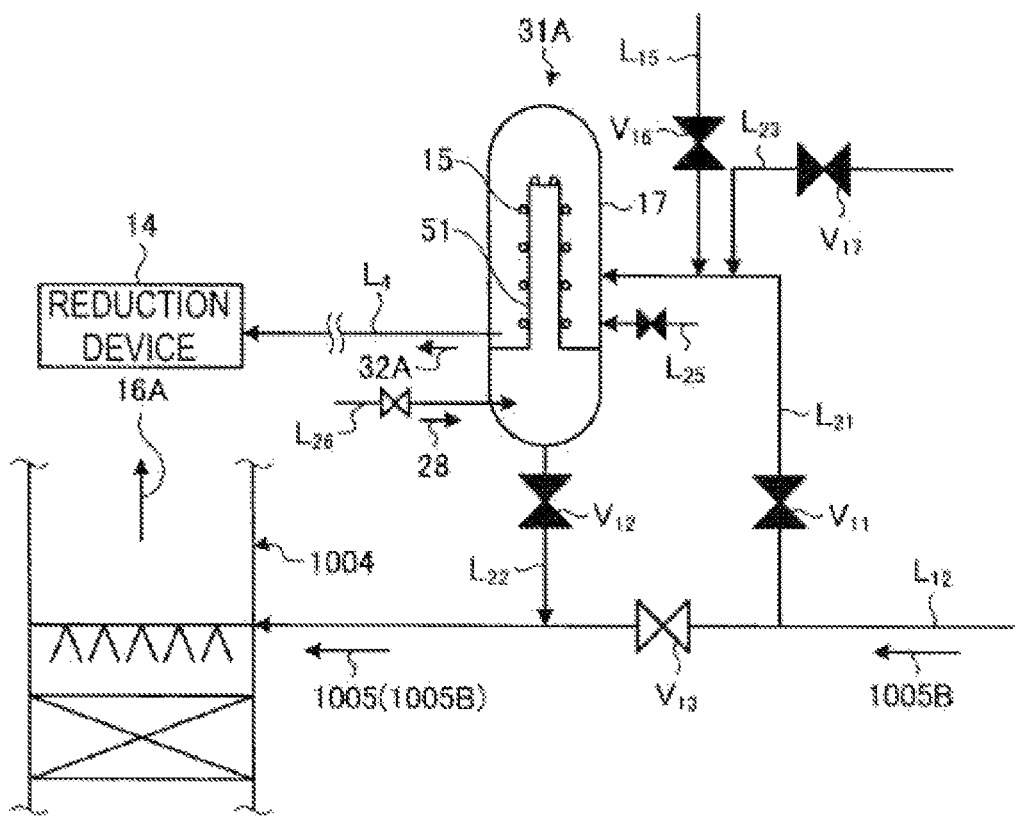

Next, a removal operation of the iron-based solid substances 15 in the recovery device collector 31A and a cleaning operation of the filter 51 are described. Each of FIG. 6-1 to FIG. 6-6 is a schematic view of an operation process of the recovery device collector in this embodiment. Normally, as illustrated in FIG. 6-1, in an operation of absorbing and removing $CO_2$ from the exhaust gas 16 and recovering $CO_2$, in a case where the absorbing liquid is circulating through the absorbing tower 1004 and the regenerating tower 1006, the $CO_2$ absorbing liquid 1005 (the lean solution 1005B) is circulated and reused in the closed system by closing a valve $V_{11}$ provided to the branch liquid line $L_{21}$ and a valve $V_{12}$ provided to the liquid filtrate supply line $L_{22}$ and opening a valve $V_{13}$ provided to the lean solution supply line $L_{12}$.

Meanwhile, in an operation of removing the iron-based solid substances 15 from the absorbing liquid when the concentration of the iron-based solid substances 15 in the lean solution 1005B is expected to be increased, as illustrated in FIG. 6-2, the valves $V_{11}$ and $V_{12}$ are opened when the lean solution 1005B-1 is filtered by the recovery device collector 31A. With this, part of the lean solution 1005B-1 extracted through the lean solution supply line $L_{12}$ is supplied into the recovery device collector 31A through the branch liquid line $L_{21}$ for supplying the lean solution 1005B-1 to the recovery device collector 31A side, and the iron-based solid substances 15 remaining in the lean solution 1005B-1 are collected with the filtering medium (not shown) of the filter 51. Further, the lean solution 1005B-2 being the liquid filtrate from which the iron-based solid substances 15 are removed is supplied to the lean solution supply line $L_{12}$ through the liquid filtrate supply line $L_{22}$.

Next, after the completion of the separation of the iron-based solid substances 15, as illustrated in FIG. 6-3, a valve $V_{16}$ provided to the cleaning water supply line $L_{15}$ is opened, and the $CO_2$ absorbing liquid having low concentration, which circulates through the system, is supplied into a filtering device main body 17 as the cleaning water 1013b. The cleaning water 1013b is supplied, and the $CO_2$ absorbing liquid 1005 adhering to the filter 51 is recovered in the cleaning water 1013b. In this manner, rough cleaning of the filter 51 is performed.

After the completion of the rough cleaning, as illustrated in FIG. 6-4, the valve $V_{16}$ of the cleaning water supply line $L_{15}$ is closed, and a valve $V_{17}$ of the cleaning water supply line $L_{23}$ is opened. With this, cleaning water 25 without the $CO_2$ absorbing liquid 1005 is supplied into the recovery device collector 31A. Through use of the cleaning water 25 without the $CO_2$ absorbing liquid, which is supplied from the outside, finish cleaning for cleaning and removing the $CO_2$ absorbing liquid 1005 adhering to the filter 51 and the iron-based solid substances 15 is performed. By performing the finish cleaning, the absorbing agent components adhering to the filter 51 and the iron-based solid substances 15, which cannot be removed through the rough cleaning, are removed.

The finish cleaning water 25A containing the $CO_2$ absorbing liquid, which is used for the finish cleaning is supplied to the lean solution supply line $L_{13}$ through a returning line $L_{22}$, and is introduced into the absorbing tower 1004.

After the completion of this cleaning, as illustrated in FIG. 6-5, all the valves $V_{11}$, $V_{12}$, $V_{16}$, and $V_{17}$ are closed, and an air 28 is supplied into the recovery device collector 31A through an air line $L_{25}$ from the same direction as that of the case where cleaning with the cleaning water 25 is performed, and the filter 51 is dried.

After the completion of the drying, as illustrated in FIG. 6-6, the compressed air 28 is supplied into the recovery device collector 31A through a back cleaning air line $L_{26}$ from an opposite direction, and the filtering medium of the filter is blown off. Then, the recovery device removed substances 32A are recycled in the reduction device 14 for iron ore through the removed substance returning line $L_4$.

As a result of introducing the finish cleaning water 25A having removed the absorbing agent components to the absorbing tower 1004, the water is introduced from the outside. Thus, a water amount inside the closed system is increased. Therefore, in this embodiment, the following operation may additionally be performed. That is, the water balance in the absorbing tower 1004 is adjusted, and the water amount in the system is retained to a predetermined value. Then, the concentration of the $CO_2$ absorbing liquid 1005 circulating through the system is retained to a predetermined value.

In this embodiment, description is given of the case of removing the iron-based solid substances contained in the $CO_2$ absorbing liquid 1005 circulating through the absorbing tower and the regenerating tower. However, the iron-based solid substances 15 contained in the cooling water 18 circulating through the cooling tower 19 may similarly be removed, and the cooling tower removed substances may similarly be recycled in the reduction device 14.

REFERENCE SIGNS LIST 10A to 10K Exhaust gas treatment systems
11 Iron oxide (for example, iron ore)
12 Reducing agent
13 Reduced iron
14 Reduction device
15 Iron-based solid substance
16 Exhaust gas
18 Cooling water
19 Cooling tower
20 Absorbing liquid
20A liquid filtrate
21 Acid gas recovery device
31A Recovery device collector
31B Cooling tower collector
32A Removed substance
32B Cooling tower removed substance
1004 Absorbing tower
1005 $CO_2$ absorbing liquid
1005A Rich solution
1005B Lean solution
1006 Absorbing liquid regenerating tower
1010 $CO_2$ recovery portion
1030 Cooling tower
1031 Cooling water

The invention claimed is:

1. An exhaust gas treatment system, comprising:
a reduction device configured to perform a reduction process to turn iron oxide to reduced iron;
a $CO_2$ recovery device that includes:
a $CO_2$ absorbing tower configured to recover $CO_2$ with $CO_2$ absorbing liquid from exhaust gas containing at least iron-based solid substances and the $CO_2$, which are discharged from the reduction device; and
an absorbing liquid regenerating tower configured to regenerate a lean solution having a low $CO_2$ concentration by diffusing the $CO_2$ from a rich solution having absorbed $CO_2$, which is supplied from the $CO_2$ absorbing tower;
a lean solution supply line through which the lean solution regenerated in the absorbing liquid regenerating tower is extracted from the absorbing liquid regenerating tower and is introduced to the $CO_2$ absorbing tower to be reused in the $CO_2$ absorbing tower;
a branch liquid line branched from the lean solution supply line;
a recovery device collector that is provided to the branch liquid line and is configured to collect the iron-based solid substances contained in the lean solution; and
a first removed substance returning line through which the iron-based solid substances collected by the recovery device collector are removed, the first removed substance returning line for returning recovery device removed substances, which contain the iron-based solid substances that are removed, to the reduction device.

2. The exhaust gas treatment system for the exhaust gas from the reduction device according to claim 1, wherein the collector includes an extraction line for extracting the rich solution from the $CO_2$ absorbing tower and a liquid filtrate supply line for returning liquid filtrate obtained after collecting the iron-based solid substances to the $CO_2$ absorbing tower.

3. The exhaust gas treatment system according to claim 1, further comprising:
a cooling tower provided on upstream of the $CO_2$ absorbing tower, the cooling tower configured to cool the exhaust gas containing at least the iron-based solid substances and the $CO_2$, which are discharged from the reduction device, with circulating cooling water;
a cooling tower collector configured to collect the iron-based solid substances contained in the circulating cooling water;
a cooling tower removing device configured to remove the iron-based solid substances collected by the cooling tower collector; and
a second removed substance returning line for returning cooling tower removed substances, which contain the iron-based solid substances removed by the cooling tower collector, to the reduction device.

4. The exhaust gas treatment system according to claim 3, wherein the cooling tower collector device includes an extraction line for extracting the cooling water from the cooling tower and a liquid filtrate supply line for returning liquid filtrate obtained after collecting the iron-based solid substances to the cooling tower.

5. The exhaust gas treatment system according to claim 1, wherein the recovery device collector includes a filter, and
wherein the filter comprises any one of a cartridge filter, a precoat filter, a metallic slit filter, a wire net filter, a sintered metal filter, and a magnetic filter, or combination thereof.

6. The exhaust gas treatment system according to claim 1, wherein the recovery device collector includes a filter,
wherein the filter comprises any one of a cartridge filter, a precoat filter, a metallic slit filter, a wire net filter, and a sintered metal filter, or combination thereof, and
wherein the filter has a surface on which a filtering medium is provided, and the filtering medium is formed of iron-based compound particles coated with a resin that are accumulated on the surface of the filter.

7. The exhaust gas treatment system according to claim 1, wherein the recovery device collector includes a filter,
wherein the filter comprises a magnetic filter,
wherein the magnetic filter has a surface on which a filtering medium is provided, and
wherein the filtering medium is formed of magnetic iron-based compound particles coated with a resin, and the magnetic iron-based compound particles are accumulated on the surface of the magnetic filter to which a magnetic field is applied.

8. The exhaust gas treatment system according to claim 3, wherein the cooling tower collector includes a filter, and
wherein the filter comprises any one of a cartridge filter, a precoat filter, a metallic slit filter, a wire net filter, a sintered metal filter, and a magnetic filter, or combination thereof.

9. The exhaust gas treatment system according to claim 3, wherein the cooling tower collector includes a filter,
wherein the filter comprises any one of a cartridge filter, a precoat filter, a metallic slit filter, a wire net filter, and a sintered metal filter, or combination thereof, and
wherein the filter has a surface on which a filtering medium is provided, and the filtering medium is formed of iron-based compound particles coated with a resin that are accumulated on the surface of the filter.

10. The exhaust gas treatment system according to claim 3,
 wherein the cooling tower collector includes a filter,
 wherein the filter comprises a magnetic filter,
 wherein the magnetic filter has a surface on which a filtering medium is provided, and
 wherein the filtering medium is formed of magnetic iron-based compound particles coated with a resin, and the magnetic iron-based compound particles that are accumulated on the surface of the magnetic filter.

* * * * *